Figures 1, 2:
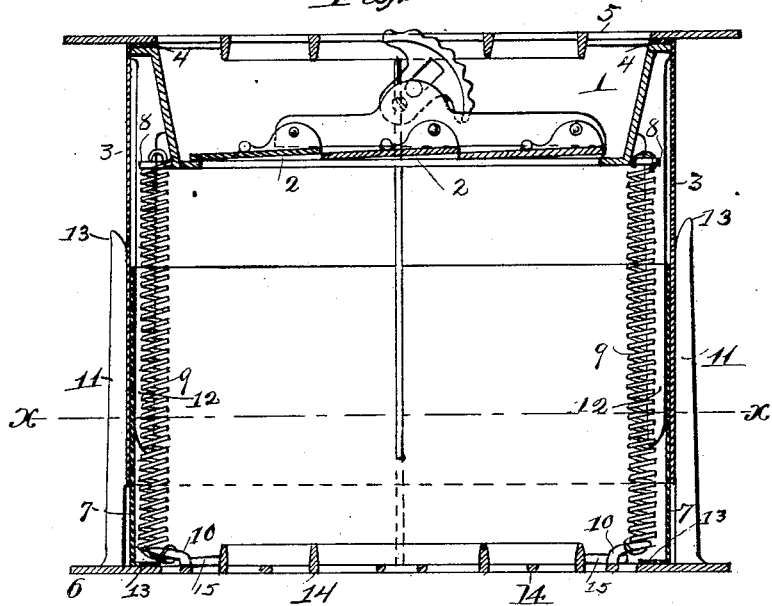

No. 702,936. Patented June 24, 1902.
E. C. FOX.
REGISTER.
(Application filed Mar. 18, 1901.)
(No Model.)

Witnesses
Inventor
Ernest C. Fox
by
Wm. M. Monroe
Attorney

UNITED STATES PATENT OFFICE.

ERNEST C. FOX, OF CLEVELAND, OHIO.

REGISTER.

SPECIFICATION forming part of Letters Patent No. 702,936, dated June 24, 1902.

Application filed March 18, 1901. Serial No. 51,680. (No model.)

*To all whom it may concern:*

Be it known that I, ERNEST C. FOX, a citizen of the United States, and a resident of Cleveland, county of Cuyahoga, State of Ohio, have invented certain new and useful Improvements in Registers, of which I hereby declare the following to be a full, clear, and exact description, such as will enable others skilled in the art to which it appertains to make and use the same.

My invention relates to improvements in registers; and the objects of the invention are to provide a register adapted for ceiling or partition walls, so that the heat from a room warmed by a stove or furnace can be utilized to heat an adjoining room or overhead chamber or shut off therefrom at will.

My invention consists in the rectangular register and ventilator plates adapted to rest against opposite sides of the partition or floor, in the square telescoping tubes connecting them, and spring connections whereby the plates are secured together, with the details of construction and combination of the various parts, as hereinafter described, shown in the accompanying drawings, and specifically pointed out in the claims.

In the accompanying drawings, Figure 1 shows a vertical transverse section of the device on line $y$ $y$, Fig. 2; and Fig. 2 shows a horizontal section of the same on line $x$ $x$, Fig. 1.

In the views, 1 is the register-bottom, inclosing the pivoted slats 2.

3 is a square tube of thin metal, as tin, provided with the inwardly-turned flange 4 all around, which is clamped between the perforated register top plate 5 and the bottom 1.

6 is the ventilator-plate, formed in openwork, which rests against the under side of the floor or inner side of the partition. To this plate is secured by a flange 13 the square metal tube 7, which telescopes within the tube 3.

Depending from either side of the register-box at 8 are seen the springs 9, which are connected at their inner extremities with hooks 10 upon the ventilator-plate.

It will readily be seen that the tubes will fill the space in the wall or floor from side to side between the register and ventilator, and the springs will permit sufficient extension of the tubes to adapt them to any thickness of wall or floor, one tube sliding within another, while holding the register and ventilator firmly in place.

At 12 are seen fingers which point downward from the register-box on the outer side, and at 11 are seen similar fingers upon the ventilator-plate, which extend upward opposite to the fingers 12. The object of these fingers is to press together the flat sides of the thin metal tubes, so that they may not flare apart and admit dust from the inside of the partition or cold air from between the floors. These fingers are curved on their points at 13, so as to slide freely over the sheet metal and press the tubes together.

A removable bottom 14, supported by lugs 15, is formed in the ventilator-plate for the purpose of giving access to the interior of the rectangular tubes in order to adjust the springs or to adjust the sliding tubes. This is quite essential to the invention.

Having described my invention, what I claim as new, and desire to secure by Letters Patent, is—

1. In combination with a register bottom and perforated top plate, a rectangular sheet-metal tube provided with a flange secured to said plate, a ventilator-plate, a rectangular sheet-metal tube provided with a flange secured to the ventilator-plate, one of said tubes sliding within the other, and springs connecting the bottom and ventilator-plate, substantially as described.

2. In combination with a register bottom and top plate thereon, a rectangular metal tube secured thereto, a ventilator-plate, and rectangular tube secured thereto, one of said tubes being telescoped within the other, and springs secured to said register-bottom and detachably connected with said ventilator-plate, substantially as described.

3. In combination, a register bottom and top plate and a ventilator-plate, and rectangular metal tubes secured to said plates, one sleeved over the other, springs connecting said bottom and ventilator-plate, and fingers arranged to extend on either side of the rectangular tubes and secured severally to the bottom and ventilator-plate, substantially as described.

4. In combination with a register top plate and bottom, a ventilator-plate, thin telescoping tubes secured respectively to said register and ventilator plates, springs connecting said register bottom and ventilator-plate, said ventilator-plate being provided with a removable central portion, substantially as described.

In testimony whereof I have signed my name to this specification in the presence of two subscribing witnesses.

ERNEST C. FOX.

Witnesses:
W. J. SHAW,
WM. M. MONROE.